Jan. 7, 1964     J. R. EVANS ETAL     3,116,539

METHOD OF MAKING SELF-ALIGNING BEARINGS

Filed Feb. 21, 1961

INVENTORS.
JACK R. EVANS
ARTHUR R. ROLLO

BY

ATTORNEYS.

United States Patent Office 3,116,539
Patented Jan. 7, 1964

3,116,539
METHOD OF MAKING SELF-ALIGNING BEARINGS
Jack R. Evans, Santa Monica, and Arthur R. Rollo, Playa Del Rey, Calif., assignors to Southwest Products Co., Monrovia, Calif., a corporation of California
Filed Feb. 21, 1961, Ser. No. 90,881
5 Claims. (Cl. 29—149.5)

The present invention relates to methods for making two-piece bearings of the character in which the race member has a keyhole-type slot through which the other piece, namely a ball, may be inserted into and removed from the race member; and the invention also relates to the bearing produced by this new method.

A bearing as described herein is of the type oftentimes referred to in the trade as a Messerschmidt-type bearing in that it includes two members, namely a race member and a ball, with the race member being slotted to form a keyhole-type slot through which the ball may be withdrawn for replacement purposes.

In the past Messerschmidt bearings have required extensive and expensive machining operations required in forming the spherical seat in the race member for the ball and the race member was machined to provide a pair of keyhole-type slots on each side of the race member.

In accordance with the present invention, the major portion of the spherical bearing surface of the race member is produced by a forming operation in which a substantial originally cylindrical portion of the race member is formed or swaged or coined around that ball which is subsequently used as a part of the finished bearing. Thus, in the formation of the race member the ball is used essentially as a die member against which the race member is accurately conformed to assure a close and uniform clearance between all adjacent surfaces of the ball and spherical seat of the race member.

It is therefore an object of the present invention to provide means and techniques whereby the above-indicated results are achieved.

Another object of the present invention is to provide a new method for producing Messerschmidt-type bearings in which the major portion of the spherical seat of the race member is produced by a forming, coining or swaging operation.

Another object of the present invention is to provide a Messerschmidt-type bearing in which the ball of the bearing had been used as a die member during formation of the spherical seat in the race member of the same bearing.

Another object of the present invention is to provide an improved Messerschmidt-type bearing in which a keyhole-type slot for withdrawal of the ball from its race member is provided only on one side of the race member.

The features of the present invention which are believed to be novel are set forth with particularly in the appended claims. This invention itself, both as to its organization and manner of operation, together with further objects and advantages thereof, may be best understood by reference to the following description taken in connection with the accompanying drawings in which:

Figure 11:
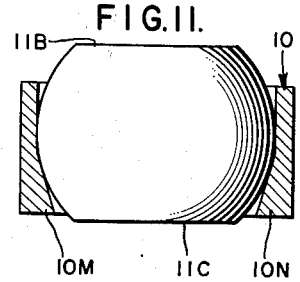
Figure 12:
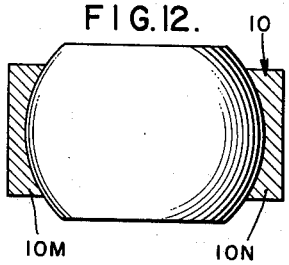

FIGURES 11 and 12 pertain to a modified method, FIGURE 11 illustrating the race member before the forming operation and FIGURE 12 showing the race member after the forming operation.

Figure 1:
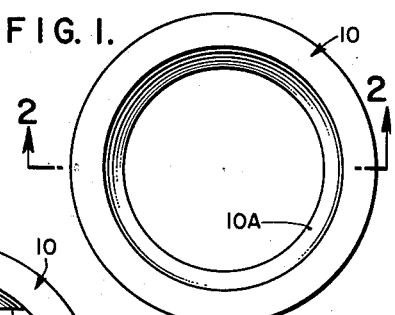
FIGURE 1 is a top plan view of a race member in the condition it is in prior to other operations performed thereon and indicated in the succeeding figures.

In the particular method described in connection with FIGURES 1–9, the race member is originally fabricated by machining, forming or otherwise to be in the form illustrated in FIGURE 1 wherein the race member 10 is in the form of an annular ring having a cylindrical outer surface and a cylindrical inner surface which, however, merges into a spherical concave portion 10A near the lower edge thereof as viewed in FIGURE 2.

Figure 2:
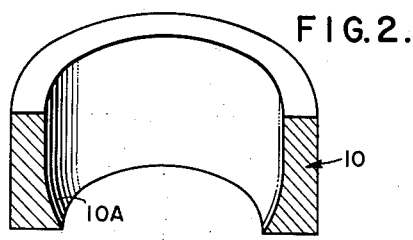
FIGURE 2 is a combined perspective and sectional view taken substantially on the line 2—2 in FIGURE 1.

After the race member is produced as shown in FIGURE 2, diametrically disposed portions of the spherical seat 10A are removed as, for example, by a machining operation, with the result that two spaced spherical seats 10B and 10C remain separated by the cylindrical inner wall portions 10D and 10E.

Figure 3:
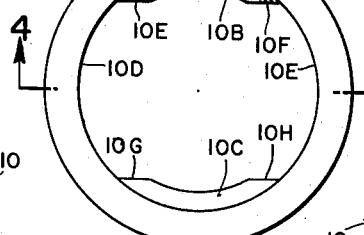
FIGURE 3 is a top plan view, like FIGURE 1, showing the race member in FIGURE 1 after portions of the inner wall of the race member are made cylindrical.
Figure 5:
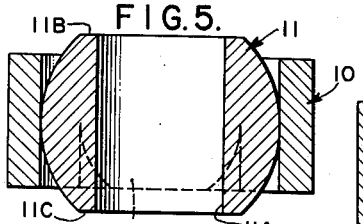
FIGURE 5 is a sectional view like that illustrated in FIGURE 4 but with the ball inserted in the race member prior to the subsequent forming operation.

The next step involves placement of the ball 11 in the race member as shown in FIGURE 3, the particular assembly at this time being illustrated in FIGURE 5.

Figure 7:
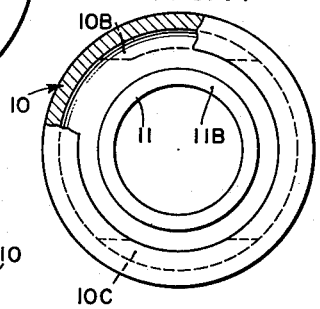
FIGURE 7 is a top plan view of the assembly shown in FIGURE 6 as taken on the line 7—7 in FIGURE 6 but FIGURE 7 illustrates a portion of the race member broken away.
Figure 8:
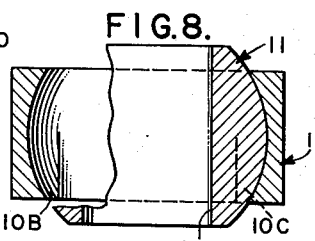
FIGURE 8 is essentially a sectional view taken substantially on the line 8—8 in FIGURE 6.
Figure 6:
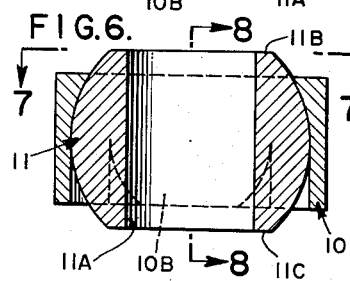
FIGURE 6 is a sectional view like FIGURE 5 and illustrates the race member after the forming operation.
Figure 9:
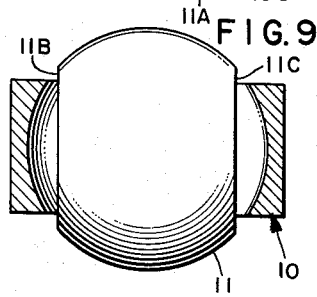
FIGURE 9 is a sectional view like that in FIGURE 8 but with the ball rotated to a position such that the ball may be removed from the race member.
Figure 10:
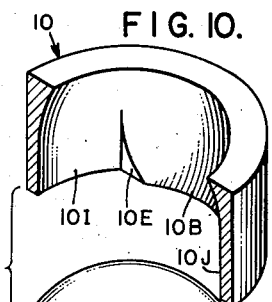
FIGURE 10 is a perspective view showing the ball and a portion of the finished race member produced by the methods disclosed herein.

After assembly as illustrated in FIGURE 5, the assembly is placed in a press between two dies which, in operation of the press, serve to form, swage or coin the race member around the ball to produce the finished bearing as illustrated in FIGURES 6, 7 and 8.

After the assembly is removed from the press, the ball 11 may be bound in the formed race member such that the ball is not free to rotate in the formed race member, but free rotation of the ball in the race member may be accomplished by applying a liberating force uniformly around the outer circumferential surface of the race member 10 as described in more detail in the Potter Patent 2,724,172.

It will be seen that the ball 11 has a spherical outer surface, has a cylindrical bore 11A extending therethrough, and end portions of the ball are cut away in planes extending perpendicular to the axis of the bore 11A to provide the two circular flat portions 11B and 11C on the ball 11.

The bearing is normally used when the parts are assembled as illustrated in FIGURES 6, 7 and 8. When it is desired to remove the ball 11 from its race member 10, for replacement or other purposes, the ball is rotated in the race member from its position shown in FIGURE 8 to its position shown in FIGURE 9 so that the ball 11 may be withdrawn through the keyhole-type slot which is defined generally by the end walls 10E, 10F of spherical seat portion 10B, the walls 10G, 10H of shperical seat portion 10C and the diametrically opposed cylindrical portions 10I and 10J. The same keyhole slot, of course, is used in the insertion of a replacement ball.

Figure 4:
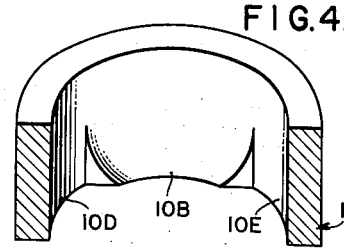
FIGURE 4 is a combined perspective and sectional view taken substantially on the line 4—4 in FIGURE 3.

Instead of the seat portions 10B and 10C in FIGURES 3 and 4 being originally spherical as illustrated in these two figures, the same may be straight tapered surfaces as shown at 10M and 10N in the modification illustrated in FIGURE 11; and the same are hobbed or formed as spherical seat portions, as illustrated in FIGURE 12, during the same operation in which the upper portion is formed around the ball as illustrated in FIGURE 12. As a result, the portions or lips 10M and 10N in FIGURE 12 are, after the forming operation, of identical shape as the seat portions 10B and 10C in the previously described figures.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In the method of making a bearing of the character described in which a ball having flat ends may be removed from a race member, the steps comprising, forming said member as an annular ring with an annular internal peripheral lip portion at one of its ends, removing diametrically opposed portions of said lip portion such that two diametrically opposed lip portions remain separated by opposed cylindrical inner wall portions, placing a ball in said annular ring in contact with said lip portions, and forming the other one of said ends around the ball, said cylindrical wall portions each being formed of a width sufficient to permit the removal of said ball after it has been rotated so that its flat ends may pass between said lip portions.

2. The method as set forth in claim 1 in which said lip portions, prior to said forming step, are formed with a spherical outer surface.

3. The method as set forth in claim 1 in which said lip portions, prior to said forming step, are formed with a straight tapered outer surface which is deformed into a spherical surface during said forming step.

4. In the method of making a bearing of the character described in which a ball having flat ends may be removed from a race member, the steps comprising, forming said race member as an annular ring with two internal diametrically spaced peripheral lip portions at one of its ends separated by two inner cylindrical wall portions, placing the spherical portion of said ball in said ring in contact with said lip portions, and forming the other end of said annular ring around said ball, said cylindrical inner wall portions each being formed of a width sufficient to permit the removal of said ball after it has been rotated so that its flat ends may pass between said lip portions.

5. In the method of making a bearing in which a ball having flat ends may be removed from a race member, the steps comprising, forming said race member as an annular ring with an annular internal peripheral portion at one of its ends, machining portions of the interior of said ring to remove diametrically disposed portions of said lip portion and to form diametrically opposed cylindrical inner wall portions that space two lip portions, placing the ball with its spherical surface on said lip portions, swaging the other end of said ring around said ball, said cylindrical wall portions each being formed of a width sufficient to permit the removal of the ball after it has been rotated so that its flat ends may pass through said machined portion and between said lip portions.

References Cited in the file of this patent
UNITED STATES PATENTS

| | | |
|---|---|---|
| 1,266,061 | Scoville | May 14, 1918 |
| 2,345,564 | Allen | Apr. 4, 1944 |
| 2,724,172 | Potter | Nov. 22, 1955 |
| 2,804,679 | Tracy | Sept. 3, 1957 |
| 2,825,608 | Abel | Mar. 4, 1958 |
| 2,857,656 | Straub | Oct. 28, 1958 |
| 2,892,246 | Mansfield | June 30, 1959 |